(12) United States Patent
Shekarri et al.

(10) Patent No.: US 8,837,901 B2
(45) Date of Patent: Sep. 16, 2014

(54) SYSTEMS AND METHODS FOR A RECORDER USER INTERFACE

(75) Inventors: Nache D. Shekarri, Phoenix, AZ (US); Patrick W. Smith, Scottsdale, AZ (US); Jasjit S. Dhillon, Santa Barbara, CA (US); Milan Cerovic, Phoenix, AZ (US); Roger Clay Winn, Jr., Cave Creek, AZ (US)

(73) Assignee: TASER International, Inc., Scottsdale, AZ (US)

( * ) Notice: Subject to any disclaimer, the term of this patent is extended or adjusted under 35 U.S.C. 154(b) by 1012 days.

(21) Appl. No.: 12/418,531

(22) Filed: Apr. 3, 2009

(65) Prior Publication Data

US 2009/0273682 A1 Nov. 5, 2009

Related U.S. Application Data

(60) Provisional application No. 61/042,751, filed on Apr. 6, 2008, provisional application No. 61/158,732, filed on Mar. 9, 2009.

(51) Int. Cl.
*H04N 5/225* (2006.01)
*H04N 5/77* (2006.01)
*H04N 5/232* (2006.01)
*G01P 1/12* (2006.01)
*H04N 7/18* (2006.01)
*G02B 27/01* (2006.01)
*G08B 13/196* (2006.01)

(52) U.S. Cl.
CPC ............ *H04N 5/232* (2013.01); *H04N 5/2251* (2013.01); *H04N 7/18* (2013.01); *H04N 5/77* (2013.01); *G02B 2027/0138* (2013.01); *H04N 7/185* (2013.01); *G02B 27/017* (2013.01); *G08B 13/19669* (2013.01); *H04N 7/183* (2013.01); *G02B 2027/014* (2013.01); *G01P 1/127* (2013.01)
USPC ............ 386/228; 386/224; 386/229; 386/234

(58) Field of Classification Search
CPC ..... H04N 7/185; H04N 7/18; G08B 13/19669
USPC ........ 348/158, 207.1; 715/716; 386/205, 221, 386/224, 226–229, 234
See application file for complete search history.

(56) References Cited

U.S. PATENT DOCUMENTS 5,594,498 A * 1/1997 Fraley ........................... 348/158
6,825,875 B1 * 11/2004 Strub et al. ............... 348/207.99
7,143,434 B1 11/2006 Paek
7,236,684 B2 6/2007 Kawakami (Continued)

OTHER PUBLICATIONS

John Virata, Pinnacle Video Transfer, Transfer your video to iPod or PSP without a computer, Jan. 17, 2008, Pinnacle Systems, downloaded from http://www.pinnaclesys.com/PublicSite/us/PinnacleLife/Content/Reviews/video+to+ipod.h on Nov. 4, 2011.*

(Continued)

*Primary Examiner* — Michael Simitoski
*Assistant Examiner* — Gary Lavelle
(74) *Attorney, Agent, or Firm* — William R. Bachand; Lawrence Letham

(57) ABSTRACT

An incident recorder records original and supplemental incident information using a simplified user interface.

10 Claims, 7 Drawing Sheets

(56) References Cited

U.S. PATENT DOCUMENTS

| | | |
|---|---|---|
| 7,269,335 B2 * | 9/2007 | Okamoto et al. ............. 386/229 |
| 7,489,853 B2 | 2/2009 | Takahashi |
| 2003/0007079 A1 * | 1/2003 | Sisselman ................ 348/231.99 |
| 2005/0179539 A1 * | 8/2005 | Hill et al. ................... 340/539.1 |
| 2006/0064384 A1 | 3/2006 | Mehrotra |
| 2006/0176369 A1 * | 8/2006 | Meritt .......................... 348/143 |
| 2006/0206911 A1 | 9/2006 | Kim |
| 2008/0030580 A1 * | 2/2008 | Kashiwa et al. ............. 348/158 |
| 2008/0117295 A1 | 5/2008 | Ebrahimi |
| 2008/0281592 A1 | 11/2008 | McKoen |
| 2009/0141129 A1 * | 6/2009 | Dischinger ................... 348/158 |
| 2009/0324203 A1 * | 12/2009 | Wiklof ............................ 386/96 |
| 2011/0134243 A1 * | 6/2011 | Siann et al. .................. 348/143 |

OTHER PUBLICATIONS

Marantz, Model PMD570 User Guide, Apr. 2004, Marantz America, LLC., p. 20, downloaded from http://us.marantz.com/us/Support/Pages/Manuals.aspx on Nov. 5, 2011.*

* cited by examiner

SYSTEMS AND METHODS FOR A RECORDER USER INTERFACE

CROSS-REFERENCE TO RELATED APPLICATIONS

This application claims benefit under 35 U.S.C. §119(e) of U.S. Provisional Application No. 61/042,751, filed Apr. 6, 2008, incorporated herein by reference and U.S. Provisional Application No. 61/158,732, filed Mar. 9, 2009, incorporated herein by reference.

BACKGROUND

An incident refers to human or animal activities and to a period of time while these activities take place. Incidents include, for example, formation of agreements, transactions, negotiations, discussions, ceremonies, meetings, medical procedures, sporting events, crimes, attempted crimes, disagreements, assaults, conflicts, discoveries, research, investigations, and surveillance. Incidents may include consequences including changes to property such as improvements, repairs, construction, production, manufacture, growth, harvesting, damage, loss, theft, burglary, arson, goods damaged in shipment, conditions of real estate, and/or conditions of agricultural and forestry property. An incident may include damage to property and/or injury to persons or animals. Damage to property or injury to persons or animals may be accidental or brought on by the action or failure to act of one or more persons. Incidents include information valuable for risk management, insurance, claims, achievements, sports records, news reporting, and entertainment.

Information (e.g., data, audio, visual, location, environmental) gathered about an incident may describe the incident. Information may include facts about the activities of the incident, consequences of the incident, time of the incident, location of the incident, and identity of humans, animals, or objects related to the incident. Information about an incident may form a report of an incident (also called an incident report). Information about the incident may be gathered before, during, or after an incident.

Information about an incident may aid others to determine the identity of the human or animal that performed the activities of the incident, whether activities were properly performed, property affected, human or animal injured; identity of witnesses, identity of a victims; responding law enforcement and medical personnel; and anyone contributing to the achievement or loss; extent of the loss or the injury; any change in property; change in the value of property; and a change in an object, person, plant, or animal.

Information about an incident may be used to establish responsibility for the consequences of an incident. For example, whether or not the facts of the incident require payment under an insurance policy may be determined on the basis of a information about the incident. When a weapon is used in an incident, responsibility for a loss or injury may in part be based on whether the weapon is used within the guidelines of a law enforcement agency, guidelines set forth by a manufacturer of the weapon, or policies and reasonable behavior or negligence as determined by local customs, courts, and educational/training institutions.

A report of an incident in many cases may be used as evidence of facts regarding the incident. Evidence may be needed for proof of performance under an agreement, resolution of a failure to perform under an agreement, credit for an achievement, proof of damage, injury, crime, or loss, or for enforcement of customs, rules, regulations, laws, judicial orders, or directives from superiors such as employers, partners, custodians, guardians, relatives, officials, or higher ranking officers.

Validation of the information of an incident report includes verifying the accuracy and completeness of the information of an incident. Validation of an incident may establish a foundation (e.g., legal foundation) and provide corroboration for the facts of an incident. Validation may provide foundation and corroboration sufficient for an incident report and the information therein to be used as evidence in a court.

Accurate and complete reporting of the facts surrounding an incident has great social, economic, and judicial importance. Incident reporting as practiced in the prior art has limitations that adversely affect accuracy and completeness. Increased accuracy and greater completeness of incident reports are needed and are provided by systems and methods according to the present invention.

BRIEF DESCRIPTION OF THE DRAWING

Embodiments of the present invention will be described with reference to the drawing, wherein like designations denote like elements, and.

DETAILED DESCRIPTION OF THE PREFERRED EMBODIMENTS

Figure 1:
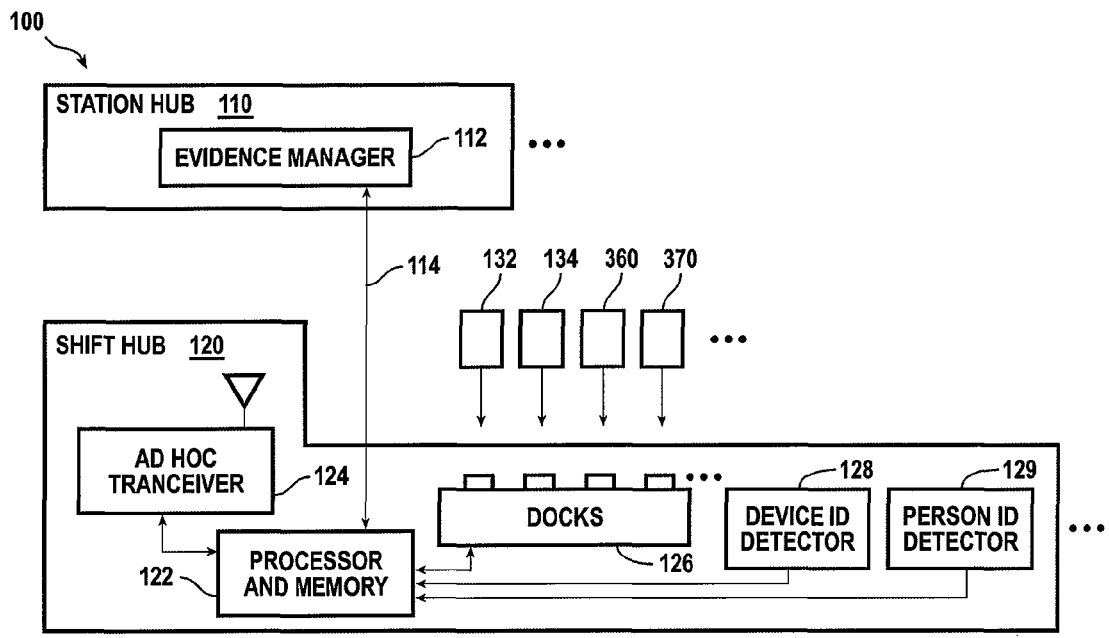
FIG. 1 is a functional block diagram of a secondary subsystem of a system for collecting and managing information about incidents, according to various aspects of the present invention.

An incident report, as discussed herein, is a report of information about an incident. An incident report may include information gathered, recorded, documented, explained, classified, described, and/or supplemented. An incident report may be formed before, during, or after an incident.

An incident report in a preferred implementation is intended to be admissible as evidence in a court. For example, an incident report may consist entirely of information stored and communicated in one or more suitable electronic formats.

According to various aspects of the present invention, an incident report may include a combination of information, also referred to as incident information, including audio, photographs, video, forms, text, graphics, scans, and electronic documents (e.g., email, word processing, spreadsheets, graphical models, photographs, equipment configuration data, equipment operation event logs).

Scans include for example scanned paper documents (e.g., tickets, titles, driver's licenses, vehicle registrations, insurance cards, bills of lading, manifests), scanned bar codes (e.g., on products, badges, driver's licenses, hospital reports, receipts), scanned magnetic stripes (e.g., bank cards, driver's licenses), scanned magnetic media (e.g. tapes, disks), scanned optical media (e.g., CDs, DVDs), and scanned glyphs (e.g., on documents, products, badges, driver's licenses).

Incident information may be recorded (e.g., audio, video) to document an incident at the time of occurrence. Recording incident information captures at least some of the information about the incident. Recording further protects against loss of information, for example, by physical loss or by faulty human memory.

After the first incident information is recorded (e.g., an original incident report) and available for review, a derivative incident report based on the incident information may be developed. A derivative incident report (also called a revision) includes the original incident information (i.e., unchanged) plus supplemental information. Supplemental information may be added to the original information to enhance an understanding of the original incident information or the incident. Supplemental information may provide additional description of the incident. Supplemental information may be formed through selecting, adding, annotating, supplementing, organizing, classifying, emphasizing, and editing, any of which being referred to herein as revising, original incident information or additional information gathered after the incident. The result of revising is herein called a revision. A revision includes original incident information combined with supplemental information.

A primary subsystem, according to various aspects of the present invention, captures original information and supplemental information to form a revision. Adding supplemental information to original incident information is important because the originally information may not fully capture what was seen, heard, or sensed by the author-operator or clarify any ambiguities in the originally information.

To improve the accuracy of incident reports and to avoid any loss of information due to lapse of time and diminution of human memory, systems and methods of the present invention provide the author-operator a capability for capturing original information, reviewing, supplementing, and classifying while at or near the incident and/or near the time the incident occurred.

In other words, systems and methods according to various aspects of the present invention may employ structures and operations that facilitate gathering, reviewing, supplementing, and/or classifying recorded information where the supplemental and/or classification information is generally recorded at a time soon after the initial incident recording is made. Furthermore, a primary subsystem according to various aspects of the present invention enables revisions to be made at the location of the incident prior to leaving the location. Making a revision that is spatially or temporally proximate to the incident provides a more complete and accurate incident report. Supplemental information provided by the author-operator may result from an analysis of the original incident information. The author-operator may describe in supplemental information and classifications what was seen, heard, or understood by the author-operator.

Systems for collecting and managing information about incidents, according to various aspects of the present invention, include primary and secondary subsystems. Primary subsystems are generally used at the time and place of the incident. Secondary subsystems generally are not used at the time and place of the incident. Primary and secondary subsystems cooperate to collect and manage information.

A primary subsystem, according to various aspects of the present invention, may capture (e.g., record) original incident information that forms the basis for an incident report. A person that operates a primary subsystem may be referred to as a user, an author, an author-operator, or simply an operator. A primary subsystem may facilitate any of the following actions performed by the author-operator in any suitable order: capturing original incident information, timely reviewing original incident information, timely gathering supplemental information, timely classifying incident information whether original or supplemental, and timely preparing one or more revisions.

A secondary subsystem may include any computer system (e.g., personal computer, server, network of servers) that receives data from one or more primary subsystems and stores, manipulates, or reports the data, for example, as evidence. A secondary subsystem may receive data as an incident report. A secondary subsystem may store, select, decompose, classify, sort, combine, compare, analyze, adjust, organize, display in accordance a classification of the information, and/or control access to incident reports. A secondary subsystem may comprise a hierarchy of components.

A secondary subsystem may include an evidence manager. A user of an evidence manager may obtain summaries of numerous incident reports using database query and reporting technologies and may view the results on a workstation. Submission of an incident report to a secondary subsystem may occur according to a predefined workflow. Any conventional workflow management technologies (hardware, software) may be used to receive, complete, validate, and authorize use of the incident report. These functions may be accomplished by different individuals along a workflow. Incident reports of the same incident, but taken from different perspectives (e.g., different primary subsystems), may be managed in converging workflows that produce a combined incident report as a new version.

An incident information, in whole or in part, may be presented to a user on a primary subsystem that includes a display or on a workstation of a secondary subsystem.

While reviewing incident information, whether original or supplemental, an author-operator may record supplemental information or classify previously recorded information (e.g., original, revisions). An operator of a primary subsystem may review, using the primary subsystem, original information or supplemental information to classify any portion of the information as belonging to a category.

A category is a descriptor or label that identifies a common aspect among members assigned to the category. Associating a member to a category (or a category to a member) is herein referred to as classifying where a member is a quantity of information recorded or to be recorded. A member may be identified by selecting any one or more portions of an incident report. Selection and classification may be according to operator input and/or performed according to predefined selection and classification criteria. Categories may be alternative (e.g., each from a suitable list) or hierarchical (e.g., subcategories) for further classifying incident information. Generally categories are predefined so that one or more categories or groups of categories may be suggested to the operator for classification. Predefined categories describe information expected to be part of an incident report or revision. In addition, categories may be user defined using any user interface technology discussed herein. User defined categories may classify unusual or unexpected information. A category may be implemented by a storage and/or transmission technology (e.g., classified information is encrypted or distributed according to a key or plan linked to one or more categories).

Categories for use with law enforcement incident reports may denote an incident type (e.g., traffic stop, burglary, patrol); an expected incident outcome (e.g., warned, ticketed, arrested); an expected piece of information (e.g., location, recording of reading the suspect rights); one or more expected types of information that facilitate handling according to various policies (e.g., unintended recording, recording outside of a mission, recording of unethical or illegal behavior of a co-worker or associate, recording containing information that should be kept secret to avoid a risk of political, legal, social, economic, religious, psychological, or physical consequences).

Categories may determine how information is stored, communicated, and/or accessed on primary and/or secondary subsystems. Classified information, according to one or more categories associated therewith, may be encrypted using particular keys, stored using a particular technology, transmitted only according to particular policies and protocols, and/or subject to access or display only according to particular policies and protocols. For example, information classified as personal-confidential may include information unrelated to an incident that was inadvertently recorded.

Categories may identify information that reveals victim identity, politically sensitive information, information proprietary to the primary subsystem operator, witness identity, innocent bystander identity, informant identity, behavior (of a co-worker, celebrity, public figure) that may merit discipline, behavior unbecoming an official, information protected by trade secret or copyright law, information related to national security. Classification facilitates handling such information according to suitable policies beginning with the original recording and revisions.

A category selected for private information may be used to determine the level of authority required to receive, locate, identify, access, and/or display the information on a primary or secondary subsystem. For example, an operator of a primary subsystem may classify a portion of an incident report as behavior that may merit discipline. Consequently, the existence and/or review of that portion of the incident report may be blocked to individuals not providing suitable credentials. Necessary credentials may belong only to a supervisor or a member of a disciplinary committee. Other staff employees may have little access and the public may have no access to such information.

Categories (or the effects of classification) are preferably integral to an incident report and its revisions. An information manager of a secondary subsystem may process information about incidents according to the classification by the author-operator and/or classification by another person who created a revision.

As discussed herein, original and supplemental recording of information may be accomplished with any suitable conventional recording technology or conventional combination of sensing, detecting, formatting, communicating, and recording technologies.

Supplementing occurs when a first presentation of audio or video content, herein also referred to as a movie, whether original or previously recorded supplemental information, plays for a duration during which an operator may indicate an instance in time for adding a second presentation that provides supplemental information or classifies the information (e.g., beginning or ending of selected information to be classified).

The second presentation may be of any duration and may include information from the first presentation (e.g., an excerpt) or supplemental information from another source. The second presentation may be limited to a still photograph with no audio (e.g., a frame from the video of the first presentation), a short loop of one or a few moments (e.g., a scene, one or more frames of video from the first presentation). In the second presentation, the operator's supplemented information may emphasize or describe an audio occurrence (e.g., a gunshot, a few words, a noise) or a visual occurrence (e.g., a glance, a facial expression) of the first presentation.

In a preferred implementation, a record of an incident is stored, reviewed, revised, and communicated in accordance with "Coding of Moving Pictures and Audio", an ISO/IEC standard, known as MPEG-4. Information in MPEG-4 format is contained in containers, defined by the format. Information recalled from an MPEG-4 containers may be used to compose scenes, movies, descriptions, supplemental information, and classification as discussed herein. Metadata describing a container may identify whether or not one or more categories (possibly further identifying which categories) have been associated with the content of the container.

Primary subsystems may perform any one or more of the following functions in any suitable combination: detecting for collecting information, recording information (e.g., original, supplemental), forming a revision, selecting information for classification, classifying information, communicating among components identified to the same operator (herein also called a personal primary subsystem), storing the identity of the operator, communicating between a primary subsystem and a secondary subsystem, storing addresses for communication, receiving software and data from a secondary subsystem, and transmitting status, data, an incident report, or a revision to a secondary subsystem.

A primary subsystem may be packaged in several units (e.g., products individually sold or handled) (herein called components) that cooperate by wired or wireless links to participate in performing the set of functions of the primary subsystem. A component may perform some functions without communication with other components of the primary subsystem.

A primary subsystem may include a detector, a recorder, and a user interface for reviewing and managing incident information (e.g., preparing supplemental information, selecting, classifying). A detector may detect any ambient condition: video, audio, ambient information (e.g., temperature, amount of light), or scanned information. A video detector may include a video camera oriented by the author-operator for recording whatever is in the field of view of the author-operator.

A primary subsystem may format detected information for recording or communicating recorded information. Preferably, detected information, whether original or supplemental, is formatted according to a format of the type known as MPEG-4. A classification may apply to the information of an entire MPEG-4 container or any portion of a container. Containers may be arranged in hierarchy for applying a classification of a parent container to all its children. A classification for one MPEG-4 container may apply to all subsequent (e.g., playback) MPEG-4 containers until reaching an MPEG-4 container having a different classification.

A recorder may store detected or revised information. A recorder may store information as MPEG-4 containers. An original incident report and related revisions may be stored serially or in hierarchy using any conventional recording and storing technologies.

A user interface may facilitate gathering original and supplemental information, forming an incident report, reviewing original and supplemental information, selecting information for classification, classifying information, and preparing revisions.

A user interface may include a display and controls. A display of a handset may be implemented using conventional touch screen technologies. A display may provide touch screen legends (e.g., icons) for manual selection by a user. A user interface may be implemented using conventional interactive-voice-response (IVR) technologies (e.g., the user interface recites an audio script with prompts (e.g., true/false, multiple-choice) to elicit a response from the user. A user may respond to an IVR script, for example, by speaking into a microphone of the user interface, selecting a legend on a touch screen display, or operating a control.

A user interface may further include controls to start, stop, or toggle functions of the primary subsystem (e.g., start if stopped, stop if started). User operated controls may be positioned on one or more components of the primary subsystem. A primary subsystem having controls on more than one component (e.g., handset, hub) that perform the same function may respond to operation of either or both controls. Operation of a control may result in a presentation of multiple-choice legends on the display for selection by the user. Functions performed by operation of a control may include start recording, stop recording, toggle recording on/off, toggle display on/off, and mark selection, review, or revision. The primary subsystem is said to be in a privacy mode (or performing a privacy function) when it is not recording.

Methods, according to various aspects of the present invention, increase the likelihood that an incident report is complete, accurate, corroborated, verifiable, accessible, integrated with other sources of information, and reliably stored (e.g., for use as evidence). These functions and advantages may be obtained by virtue of the variety of elements of an incident report (e.g., sounds, movies, forms, text, graphics, documents, scans) and the capability of revising a scene based on any or all of these by the author-operator of the primary subsystem.

Revisions may improve the emphasis or clarity of an incident report. Video images may be cropped, panned, and/or zoomed. Movies may be clipped. Photographs may be cropped and/or scaled. Audio streams may be clipped. Printed information may be amended or partially rewritten for clarity. Supplemental information may be provided by the author-operator regarding the original recording. All of these revisions may occur at the primary subsystem by operation of a user interface. The time (e.g., time of day, date) of making a revision may also be recorded. The original recordings are preferably retained. The revisions preferably form a new version of the incident report.

For example, a system for collecting and managing evidence may include any number of station hubs (e.g., secondary subsystems) coupled by a network to any number of shift hubs (e.g., secondary subsystems). A station hub provides secure operation of a manager of information about incidents (e.g., an evidence manager). A network supports data and inter-process communication. Any conventional protocol may be used (e.g., an internet or intranet protocol stack). A shift hub provides data transfer from a primary subsystem (e.g., incident reports and revisions), recharging of rechargeable batteries, and/or data transfer to the primary subsystem (e.g., software upgrades, information regarding tactical tasks, evidence collection tasks, communication tasks).

For example, a system for collecting and managing information about incidents 100 of FIG. 1 includes station hub 110 coupled by network 114 to shift hub 120. Station hub 110 hosts evidence manager 112 (e.g., a database manager adapted in a conventional manner for managing evidence). Hosting includes a conventional secure computing environment (e.g., physical security, communication security, access controls, encryption, personnel authentication). Network 114 provides secure communication between any number of station hubs 110 and shift hubs 120. Shift hub 120 includes a processor 122, an ad hoc transceiver 124 for wireless communication with any suitable number of primary subsystems equipped for wireless data transfer, docks 126 for wired connection to any suitable number of primary subsystems, a device identification detector 128, and a person identification detector 129.

Processor 122 via ad hoc transceiver 124 and docks 126 may poll primary subsystems or components that are within range for maintaining wireless ad hoc communication based on one or more suitable communication channels (e.g., conventional IR, radio, or wireless network channels) and using one or more suitable communication protocols (e.g., conventional IEEE 802). Such a network is "ad hoc" because candidates of the network may enter and members of the network may exit (e.g., moved by humans) the zone of communication without advance notice to processor 122. Processor 122 detects entry and exit of a primary subsystem and component from the ad hoc network and maintains the ad hoc network with as many members as practical for the capability of processor 122.

A device identification detector detects an identification of a component of a primary subsystem or of an entire primary subsystem (e.g., a personal primary subsystem). For example, on check-in to shift hub 120 (e.g., via docking or local ad hoc communication), device identification detector 128 identifies the components or a primary systems and associates the detected identities to the incident reports transferred from the components or primary subsystems to shift hub 120. Identification and association provides evidence validation (e.g., custody, control). On checkout from shift hub 120 (e.g., via undocking or removal from local ad hoc communication), device identification detector 128 identifies components to the primary subsystems (e.g., in the same or another component) so that incident reports are recorded in association with that component's identification, again for purposes of evidence validation.

A person identification detector detects an identity of a person associated or to be associated with a primary subsystem. For example, on check-in of a primary subsystem to shift hub 120, the person that plugs components of the primary subsystem into docks 126 may be identified by person identification detector 129 for association to the incident reports transferred from the primary subsystem for purposes of evidence validation. On checkout of a primary subsystem from shift hub 120 (e.g., removal from docks 126), the person that removes components of the primary subsystem may be identified to the primary subsystem so that incident reports are recorded in association with that person's identification, again for purposes of evidence validation.

Docks 126 accept, by plug-in to a wired network, any suitable number of primary subsystems or components thereof. Docks may also provide a location (e.g., a bin) within range of ad hoc transceiver 124 for communication between processor 122 via transceiver 124 and any number of primary subsystems or components thereof placed at the location (e.g., in the bin). The location may be suitable for detecting device identification by device identification detector 128. For example, handsets 132 and 134 may be plugged into docks 126. Headsets 222 and 232, personal hubs 224 and 234 may be located in a bin (not shown) for scanning or programming by device identification detector 128.

Docks 126 locate and link for communication components and primary subsystems for data transfer to secondary subsystem 110 as coordinated by processor 122 and evidence manager 112. Data transfer may include original and supplemental information, incident reports, classification within incident reports, and usage logs. If other components of primary subsystems are nearby but not plugged into docks 126, data transfer may occur via ad hoc transceiver 124 as controlled by processor 122 for communication with those other components and primary subsystems capable of wireless communication.

Figure 2:
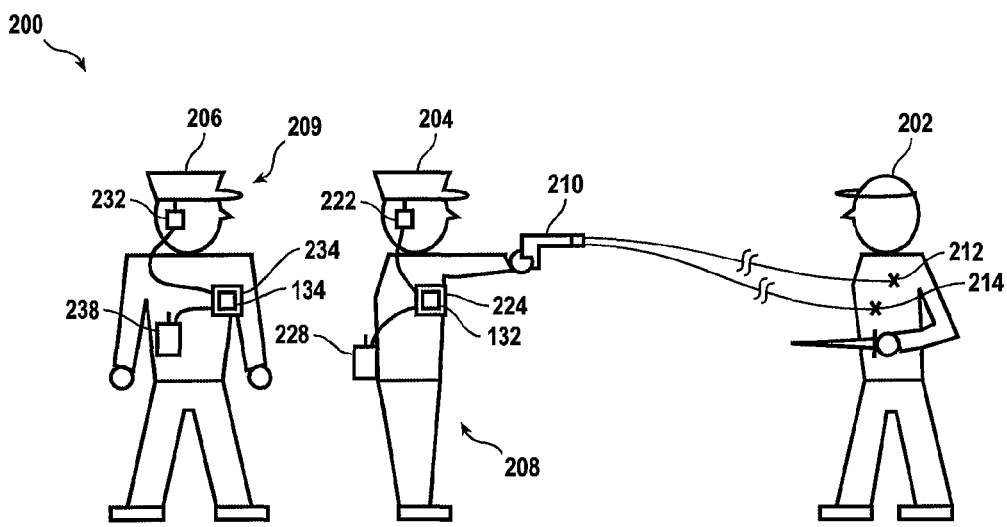
FIG. 2 is a pictorial representation of a hypothetical incident involving two law enforcement officers apprehending a suspect while each officer is operating a respective primary subsystem of a system for collecting and managing information about incidents, according to various aspects of the present invention.

A hypothetical incident and application of systems and methods according to various aspects of the present invention is illustrated in FIG. 2. FIG. 2 pictorially represents a hypothetical incident involving two law enforcement officers 206 and 204 apprehending a suspect 202 while each officer operates a respective primary subsystem, herein called a system for incident recording 208 and 209 (herein also called an incident recorder), according to various aspects of the present invention.

Officer 204 operates an electronic control device 210 (e.g., a TASER International model M26 or X26 device) that deploys two wire-tethered electrodes and hits suspect 202 at contact points 212 and 214. Current generated by the electronic control device flows through the wires, electrodes, and tissue of the suspect to cause involuntary muscle contractions, halting locomotion by the suspect and facilitating arrest of the suspect. Incident recorder 208 worn by officer 204 records a movie (e.g., original audio and video information) during the confrontation. System for incident recording 209 worn by officer 206 also records a movie during the confrontation from a different point of view.

In this example, systems 208 and 209 are identical. Each system includes a headset 222 (232), personal hub 224 (234), handset 132 (134), and on-duty transceiver 228 (238). Each headset 222 (232) includes a camera and microphone oriented away from the officer toward the field of view of the officer's eyes. Soon after suspect 202 is arrested (e.g., hand cuffed, shackled, confined), officer 204 (206) may independently review the movie that was recorded and add supplemental information and classifications to any portions of the movie.

Reviewing is accomplished by watching previously recorded information on the display of the handset. Adding a quantity of supplemental information (e.g., adding a description) is accomplished, among other things, by identifying a scene, and adding audio (e.g., talking about the scene into a microphone of the headset or personal hub), adding video (e.g., removing the camera from the headset and orienting it toward anything of interest), or adding graphical information (e.g., describing in a standardized way where on the body of the suspect contact points 212 and 214 occurred).

Classifying is accomplished by reviewing previously recorded information (e.g., original, supplemental, revision) selecting recorded information (or designating information to be recorded) and associating one or more categories (e.g., subject matter) to the selected information. A classification may apply to any portion of a movie. Recorded information may have one, several, or no classifications.

Figure 3:
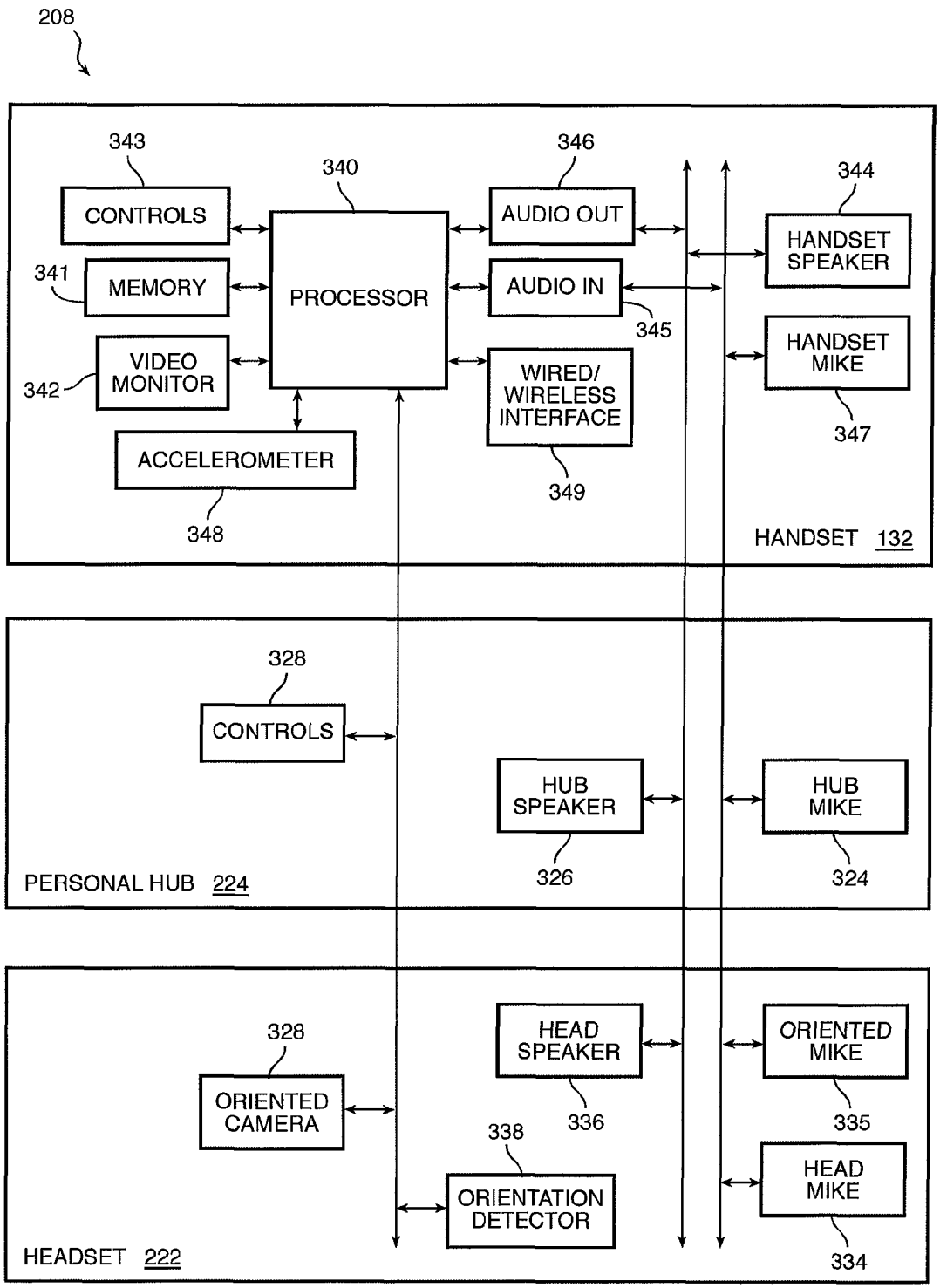
FIG. 3 is a functional block diagram of an implementation of one of the primary subsystems, herein referred to as an incident recorder, of FIGS. 1 and 2.

In an implementation, a system for incident recording 208 of FIG. 3 includes handset 132, personal hub 224, and headset 222. Handset 132 includes processor 340, memory 341, video monitor 342, controls 343, handset speaker 344, audio in circuit 345, audio out circuit 346, handset mike 347, accelerometer 348, and wired/wireless interface 349. Personal hub 224 includes hub mike 324, hub speaker 326, and controls 328. Headset 222 includes head mike 334, oriented mike 335, head speaker 336, oriented camera 337, and orientation detector 338.

In another implementation, incident recorder 208 or 209 includes headset 500, personal hub 600 and handset 700. Headset 500 includes oriented camera 510, oriented mike 520, head mike 530, head speaker 540, orientation detector 550, and conductor 560. Personal hub 600 includes hub mike 620, volume 624, hub speaker 626, event switch 630, privacy switch 640, privacy indicator 642, conductor 560, and conductor 612. Handset 700 includes power switch 720, handset speaker 722, volume 724, handset mike 726, display 730, picture-in-picture 732 portion of display 730, legends 740, event switch 750, privacy switch 760, privacy indicator 762, display toggle switch 770, and conductor 612.

The functions and functional cooperation of the components of the incident recorder are discussed below.

A handset, according to various aspects of the present invention, provides a display and provides controls sized and positioned for operation by a user's fingers or thumbs. A handset operates to record original incident information. A handset operates to review original incident information and to record supplemental incident information. A handset operates to classify original and supplemental incident information. A handset may receive information from another component of the incident recorder (e.g., hub, headset) for recording by the handset. A handset may communicate an incident report to other portions of an incident recorder or to a secondary subsystem.

For example, handset 132 (700) receives from personal hub 224 (600) or headset 222 (500) signals that convey audio or video information. Handset 132 stores the audio and video information in MPEG-4 format in memory 341. In another implementation, personal hub 224 (600) is omitted and handset 132 (700) cooperates directly with headset 222 (500) through a wired interface to convey audio and video signals and to record the signals. In another implementation, headset 222 (500) is omitted and handset 132 includes a microphone and speaker for use by the author-operator of the handset and an oriented microphone (not shown) and oriented camera (not shown) that are oriented by the author-operator of the handset.

A personal hub, according to various aspects of the present invention, couples one or more of a headset and a handset. A personal hub may include a wired interface or a wireless interface to a headset or a headset. A personal hub may include controls for operation by a user's fingers or thumbs. Some controls of a personal hub may perform operate functions similar to the controls of a handset. While a personal hub is coupled to a handset, the controls on either the handset or the personal hub may be used to operate the handset.

For example, personal hub 224 (600) provides a wired interface to headset 222 (500) and handset 132 (700). An operation of event switch 630 or privacy switch 640 operates on handset 700 to perform the same functions as an operation of event switch 750 or privacy switch 760.

A primary subsystem may be implemented without a personal hub where, for example, a user interface of the handset is sufficient for intended operations of the primary subsystem.

A headset is adapted to couple to a head of an author-operator. A headset, according to various aspects of the present invention, supports visual and audio detectors. A headset may have a predetermined orientation on an author-operator's head. A detector may be oriented with respect to the headset and thus be oriented with respect to the author-operator's head. An oriented detector may include any device for detecting physical phenomena that is oriented (e.g., positioned) along a same general direction as a sense (e.g., sight, hearing) of the author-operator.

A headset may include, as an oriented detector, a microphone for detecting sound. The microphone may be oriented in a direction of hearing of the author-operator. A headset may include, as an oriented detector, a camera for detecting radiant energy in any suitable channel or spectrum in a direction of sight of the author-operator.

A headset may include a source of radiant energy (e.g., laser, light, EM pulse) and a detector for detecting radiant energy from the source that is reflected towards the headset. A headset may include a laser for identifying a reference location or for use as a designator for orienting a data source or targeting weapons.

For example, headset 222 (500) is worn on the head of a human operator. Headset 222 (500) includes oriented microphone 335 (520) and oriented camera 337 (510) for continuously detecting audio and visual (or infrared) information from the direction facing the operator. Because handset 222 (500) is attached to the operator's head, the orientation of microphone 335 (520) and oriented camera 337 (510) retains its orientation in the direction facing the operator as the operator turns his or her head to face a different direction. Headset 222 (500) further includes microphone 334 (530) and speaker 336 (540) located proximate to the mouth and ear respectively of the human operator for receiving descriptive information from the author-operator and for providing a review of recorded information.

A processor includes any circuitry or subsystem that performs a stored program. A processor may include a dedicated digital signal processor, a microcontroller, a microprocessor, an application specific integrated circuit, logic circuitry, MEMS device, signal conditioning circuitry, communication circuitry, a computer, a radio, a network appliance, combinations thereof in any quantity suitable for accomplishing one or more stored programs.

For example, processor 340 includes a digital signal processor for digitizing audio signals, a microcontroller for supporting video display and user interface controls, and a microcomputer with an operating system and application software for performing all other functions of handset 132 (700). In another implementation, greater signal processing throughput is supported with additional parallel processing circuits and technologies.

A memory includes any semiconductor, magnetic, optical technology, or combination thereof for storing information. All or a portion of memory may be on removable media removed from handset 132 (700) for transferring data out of handset 132 (700) or for introducing data into handset 132 (700) (e.g., software upgrade, replacement information for any information described with reference to FIG. 4). For example, memory 341, stores information as described with reference to FIG. 4 using non-removable semiconductor technology. A portion of memory 341 may be maintained in nonvolatile memory to avoid data loss in the event of failure or removal of battery power to handset 132 (700).

A video monitor provides a display of video information (e.g., a movie). A video monitor may present legends for controls of a user interface. A video monitor may present video information as it is being originally recorded and recorded information for review. A video monitor may present supplemental video information. A video monitor may include a processor or circuitry for supporting the display. A video monitor may employ any display technology suitable for the environment in which handset 132 (700) is used. In an implementation, video monitor 342 includes a conventional LCD display that presents video in shades of green for visibility outdoors. In another implementation, video monitor 342, or a monitor in addition to video monitor 342, is included in headset 222 (500) and the correlation of legends on the display with controls of the user interface does not require the trained user to view his or her hands when operating the controls. In another implementation, video monitor 342 includes a touch-screen display (730) that receives author-operator input via author-operator contact with the display.

A control, according to various aspects of the present invention, is a part of a user interface that provides input to a processor in response to an action by an author-operator. A control may be operated as a consequence of any muscle contraction by the operator. A control may be incorporated into clothing worn by the operator (e.g., gloves, sleeves, shoes). A control may provide analog or binary information to a processor. A control may comprise a detector of a binary condition or a detector of an analog condition. A control may include a portion of a touch-screen display.

For example, controls 343 include a first plurality of touch-screen legends 740 (four legends shown) positioned on display 730 of video monitor 342. Legends may be organized as hierarchical menus. The touch-screen legends of controls 343 may be sized and positioned on the display of handset 132 (700) for operation by the operator's thumbs. Operation (e.g., touching, pressing, selecting) of touch-screen legend 740 selections the function indicated by the legend. Legends 740 may be defined and redefined by processor 340 within any suitable operating context, state, or mode of operation, thus many if not all functions of handset 132 may be operated via legends 740.

Controls 343 may further include dedicated switches that when operated initiate performance of a dedicated function. In one implementation, operation of event switch 750 (630) starts the recording of incident information by handset 132 or 700, operation of privacy switch 760 (640) stops the recording of incident information by handset 700, operation of display switch 770 toggles the operation of display 730 between an on-state and an off-state. While personal hub 600 is coupled to handset 700, an operation of event switch 630 and privacy switch 640 perform the function of event switch 750 and privacy switch 760 respectively.

In another implementation, controls 343 include multiple-function switches. A function performed by multiple-function switch depends upon the operating context of handset 132 or 700. While handset 700 operates to gather original incident information, event switch 750 (630) and privacy switch 760 (640) operate as described above. While handset 700 operates in a review mode in which original information or previously recorded supplemental information is presented on display 730, event switch 750 (630) toggles recording to start and stop recording of supplemental information by handset 132 or 700; and privacy switch 760 (640) initiates presentation by handset 132 or 700 of suggested categories as touch-screen legends 740 to facilitate classification. When a touch screen legend is touched by the operator, handset 132 (700) classifies the selected information by associating the category of the legend to the selected information.

Controls 343 may further include power switch 720 and volume switch 724 (624). An operation of power switch 720 toggles power to handset 700 on and off. An operation volume switch 724 (624) increases or decreases the audio volume provided by handset speaker 722, hub speaker 626, or head speaker 540.

Head speaker 540 may include conventional headphones or ear buds.

An audio-in circuit provides audio information to a processor in a suitable signal format. Signal conditioning, analog to digital conversion, sampling, multiplexing, and filtering may be accomplished by an audio-in circuit. For example, audio-in circuit 345 provides to processor 340 audio information responsive to analog microphones including handset mike 350 (726), hub mike 324 (620), head mike 334 (530), and oriented mike 335 (520). Conversion to MPEG-4 format may be accomplished by processor 340 or audio-in circuit 345.

An audio-out circuit receives audio information from a processor in a signal format suitable for communication or conversion into sound. For example, audio-out circuit 346 in cooperation with processor 340 converts audio information from MPEG-4 format to analog format for use by a conventional speaker (e.g., head speaker 336 (540), hub speaker 325 (626), handset speaker 334 (732)). In another implementation, audio-in circuit 345, processor 340, and audio-out circuit 346 cooperate to provide audio output for use with conventional noise cancellation technologies implemented at hub speaker 326 (626) or head speaker 336 (540). In an implementation, additional microphones are co-located near speakers to provide additional signals to audio-in circuit 345 and processor 340 for performing noise cancellation. Processor 340 and audio-in 345 may include noise cancellation processing circuitry or software.

As used herein, a signal conveys information. A signal may be conveyed on a conductor or recognized as a particular value in a processor (e.g., 340) or memory device (e.g., 341). When a functional block is responsive to information, the circuitry implementing the functional block receives a signal that conveys the information and demodulates, or otherwise, determines the information for performance of a function of the block. Receiving may be continuous or discontinuous. Performing the function may occur whenever sufficient information is received.

Components (e.g., handset 132 (700), personal hub 224 (600), headset 222 (500)) of an incident recorder (e.g., 208, 209) may each include respective device identification functions. A device identification function may be implemented in any conventional manner to identify the component of a primary subsystem to a shift hub as discussed above. The identification may be human readable as well as machine-readable. If a component includes a user interface, the device identification may be entered, edited, augmented, or verified by the operator.

Hub microphone 324 (620) and hub speaker 326 (626) pick up the operator's voice and play audio into the operator's ear respectively. Hub microphone 324 (620) provides an analog signal conveying audio information to audio-in 345. Hub speaker 326 (626) provides audible sound in response to a signal received from audio-out 346. Hub microphone 324 (620) and hub speaker 326 (626) provide redundant functions with head microphone 334 (530) and head speaker 336 (540).

Audio-in 345 receives audio information from hub mike 324, head mike 334, oriented mike 335, and handset mike 347. In suitable relative volumes among these audio sources and at suitable times based on a priority of audio sources, audio-in 345 provides audio information to processor 340.

Audio-out 346 receives audio information from processor 340. In suitable relative volumes among these audio sources and at suitable times based on a priority of audio sources, audio-out 346 provides audio information to handset speaker 344 (722), hub speaker 326 (626), and head speaker 336 (540).

Head microphone 334 (530) and head speaker 336 (540) pick up the operator's voice and play audio into the operator's ear respectively. Head microphone 334 (530) provides an analog signal conveying audio information to audio-in 345. Head speaker 336 (540) makes audible sound in response to a signal received from audio-out 346. Due to the location on the operator's head, head microphone 334 (530) and head speaker 336 (540) may provide more private audio communication with an author-operator than possible with hub microphone 324 (620) and hub speaker 326 (626) or handset microphone 347 (726) and handset speaker 344 (722).

An oriented microphone moves with movement of the author-operator's head to receive sound that approaches the operator's face. An oriented camera moves with movement of the author-operator's head to capture radiant energy (e.g., ambient or illumination of visible or IR light) that approaches the operator's face. Consequently, as an author-operator performs his or her routine, audio and visual information captured for recording generally corresponds to the audio and visual information that reaches the author-operator's senses. Oriented mike 335 (520) may have a relatively narrow field of sensitivity projected in front of the author-operator suitable for capturing speech intended for the author-operator to hear and respond to. Oriented camera 337 (510) may have a relatively wide field of sensitivity to correspond more closely with the field of view of a human author-operator. Oriented microphone 335 (520) may be implemented as an omnidirectional microphone or stereo microphone and as such may not be "oriented" in the same manner that oriented camera 337 is oriented.

Figure 4:
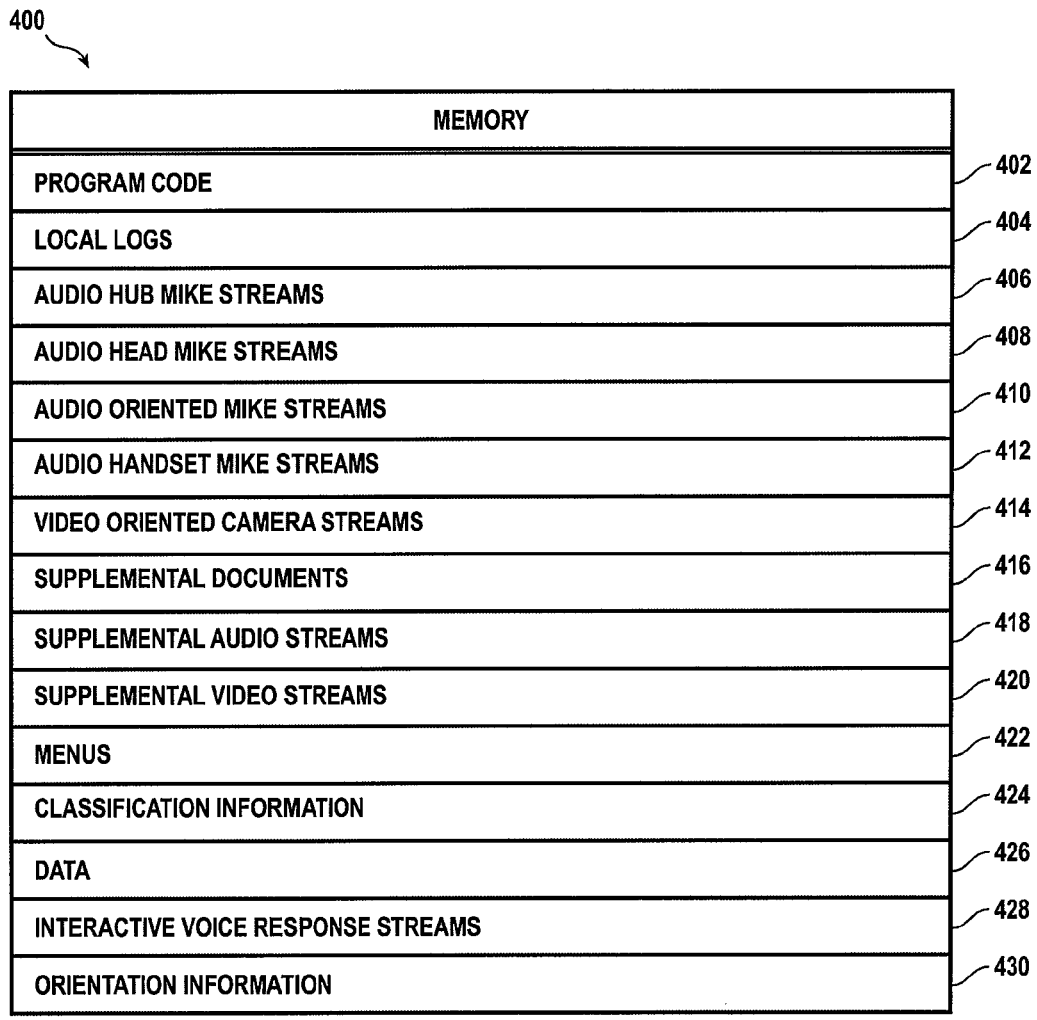
FIG. 4 is a data structure diagram describing the contents of memory in an implementation of the handset of FIGS. 3 and 7.
Figure 5:
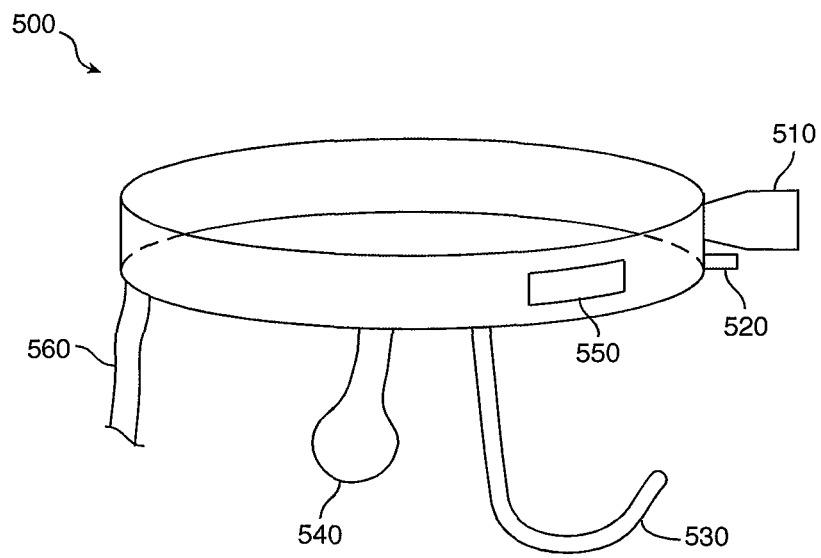
FIG. 5 is a plan view of an implementation of the headset of the incident recorder of FIG. 3.
Figure 6:
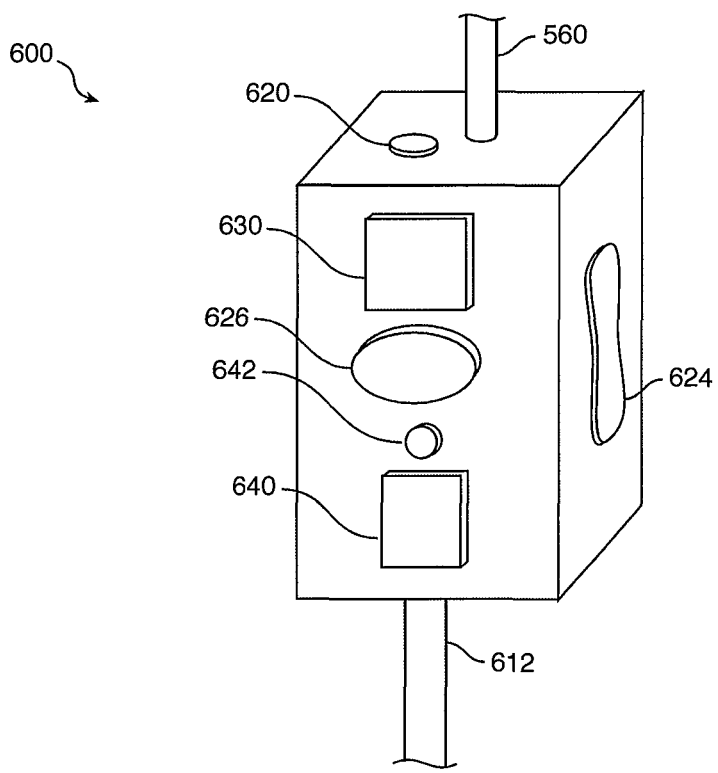
FIG. 6 is a plan view of an implementation of the personal hub of the incident recorder of FIG. 3.

Memory 341 includes data stored in any suitable organization and format. In one implementation, contents of memory 341 include data structures 400 as described below with reference to FIG. 4. Data may be organized for storage in a data structure of any conventional type including value, list, table of records, file, tree, graph, hierarchy of records, or hierarchy of tagged strings consistent with a markup language. Data in any organization and plural organizations may be stored in containers. The description of memory 341 shown in FIG. 4 is more akin to a functional block description than a data structure or container description. Nonetheless, the data stored in memory 341 and the manner in which it is accessed by processor 340 specifies the structure of memory 341.

A wired and/or wireless interface provides communication between handset 132 and shift hub 120. The wired interface enables handset 132 to electrically couple to dock 126 to communicate information between handset 132 and shift hub 120. A wireless interface enables handset 132 to wirelessly communicate with ad hoc transceiver 124 of shift hub 120. In one implementation, handset 700 uses a wired interface to couple both battery charging currents and data communication signals to docks 126 of shift hub 120.

An orientation detector detects an orientation and a change in orientation of an object. An orientation detector may report an orientation or a change in an orientation of an object. An orientation detector may provide an analog or digital signal consistent with an orientation of an object. An orientation detector may detect any physical property (e.g., gravity, inertia, magnetic field, EM waves) or change in a physical property to detect orientation or a change in orientation. In one implementation, orientation detector 338 (550) includes a three-axis gyroscope that detects the orientation and changes in the orientation of headset 222 (500) and thus the orientation of the operators head. The orientation of the operator's head may be recorded with and be correlated to other incident information.

Information provided by an orientation detector may be used for any purpose suitable for incident recording. Orientation information may be used to index incident information for review and searching. For example, handset 132 or 700 may provide a list of locations in original incident information in which the author-operator oriented headset 500 toward himself or herself (e.g., look down, look at feet). Such an orientation may include unintended recording and be suitable for classification as personal-confidential as discussed above by operation of handset 132 (700) without user input for selection of information or identification of a category. Similarly, an automatically prepared index of original or supplemental information formed with respect to headset orientation may be presented as legends to permit a user to search for locations in which headset 222 (500) was oriented at a pre-programmed or user-identified orientation. Orientation for automatic classification may be defined relatively (e.g., to the right) or absolutely (e.g., to the north-west).

Data structures 400 include program code 402, local logs 404, audio hub mike streams 406, audio head mike streams 408, audio oriented mike streams 410, audio handset mike streams 412, video oriented camera streams 414, supplemental documents 416, supplemental audio streams 418, supplemental video streams 420, menus 422, classification information 424, other data 426, interactive-voice-response streams 428, and orientation information 430.

Program code 402 includes instructions performed by processor 340 to accomplish any methods and functions ascribed to processor 340 or handset 132 (700). Program code 402 includes operating systems for processor 340 and application software. Application software includes software for recording audio and video in MPEG-4 format, software for operating a user interface for a handset as discussed herein, software for reviewing recorded information, software for determining revisions in MPEG-4 format, software for classifying incident information, and software for communications.

For improved information gathering and transfer, application software may further include software for noise cancellation, video enhancement (e.g., stabilization, bounce removal, light level compensation), identification of the author-operator of the camera (e.g., during recording) and the handset (e.g., during revising), identification of other components of the incident recorder (e.g., serial numbers, types, manufacturers), interactive voice response, transcription of speech to text, and 3D modeling for graphic presentations including data collection graphics.

Recorded audio and video may be stored for at least two purposes. A pre-event buffer may retain continuously recorded audio and video information in a circular buffer (e.g., 60 seconds duration) so that when the operator indicates a time to begin recording an event (e.g., operation of a control 343 or 328), audio and video from before the operator's indicated time is available, for example, to provide information as to why the user decided to begin recording the event (e.g., incident, revision).

Any number of events may be recorded, preferably one event at a time. The end of each event may be indicated by the author-operator by operation of control 343 or 328. Controls 343 or 328 may include a dedicated switch (e.g., event switch 630 or 750) for indicating a start and an end of an event. Menus may permit the user to actuate legends 740 to indicate the end of an event.

An incident report may include supplemental information as described above. Supplemental information may include portions of logs, interactive voice response streams, data collection forms or overlays, a user provided classification, data collection graphics or overlays whether or not any or all of this information is included in a revision. In a preferred implementation, a revision includes all relevant information including one or more movies, all scene descriptions, portions of logs, interactive voice response streams, classifications, data collection forms or overlays, and data collection graphics or overlays.

Storage of recorded audio or video in a "buffer" as stated herein does not designate a format for storage. A buffer as used herein may hold any audio or video stream in any format (e.g., MPEG-4 format). A pre-event or event stored in a buffer does not designate a contiguous region of memory. Streams that are part of a pre-event may be stored in the same or different buffers. Streams that are part of an event may be stored in the same or different buffers. Streams that are part of supplemental information, a description, or a revision may be stored in the same or different buffers. In one implementation, a buffer is coextensive with an MPEG-4 container.

A log is a list of records each describing a change and noting the time when the change occurred. Local logs 404 are updated on the occurrence of a change in the configuration or operation of incident recorder 208 and handset 132 (700). For example, local logs 404 may include an entry for application of power to handset 132 (700), removal of power from handset 132 (700), switching video monitor 342 on or off, adjustment of a time base used by handset 132 (700) (e.g. synchronization of time of day, date), entry and exit from privacy mode (e.g., a privacy function), and adjusting or establishing parameters that affect recording or revising (e.g., pre-event buffer length, video resolution for pre-event or event, software upgrades).

Audio hub mike streams 406 include buffers for storage of audio for any one or more of pre-events, events, supplemental descriptions, and revisions.

Audio head mike streams 408 include buffers for storage of audio for any one or more of pre-events, events, supplemental descriptions, and revisions.

Audio oriented mike streams 410 include buffers for storage of audio for any one or more of pre-events, events, and revisions.

Audio handset mike streams 412 include buffers for storage of audio for any one or more of pre-events, events, supplemental descriptions, and revisions.

Video oriented camera streams 414 include buffers for storage of video for any one or more of pre-events, events, and revisions.

Supplemental documents 416 include buffers for text entry or scanned paperwork for revisions.

Supplemental audio streams 418 include buffers for supplemental audio from the author-operator (spoken impromptu or in reply to an interactive voice response script) for revisions. Supplemental audio streams 418 may include audios streams for supplement information form all audio sources or from select audio sources. Supplemental audio information may be apportioned for storage in supplemental audio streams 418 and audio hub mike streams 406, audio head mike streams 408, audio oriented mike streams 410, and audio handset mike streams 412.

Supplemental video streams 420 include buffers for supplemental video for revisions. Supplemental video information may be apportioned for storage in supplemental video streams 420 or video oriented camera streams 414.

Menus 422 include legends that are displayed on display 730 of video monitor 342. Legends may be responsive to a mode of operation of handset 132 or 700.

Classification information 424 includes indicia of categories, suggested groups of categories, user defined categories, and associations of categories with information stored in other data structures 400 as discussed above. Classification information may be presented on display 730 (e.g., categories) as legends 740 for selection by a user to classify particular information. Classification information 424 may store one or more associations of categories and information selected by a user or selected and classified automatically as discussed above. Indicia of classification may be included in an incident report or revision. Classification information may be communicated to and/or from shift hub 120.

Data 426 includes all variables and temporary storage required for the performance of the program code 402. Data may further include device identification for the component that stores the data structure (e.g., handset 132 (700)) and for the primary subsystem to which it is a part (e.g., 208) or any or all of its components (e.g., personal hub 224 (600), headset 222 (500)).

Figure 7:
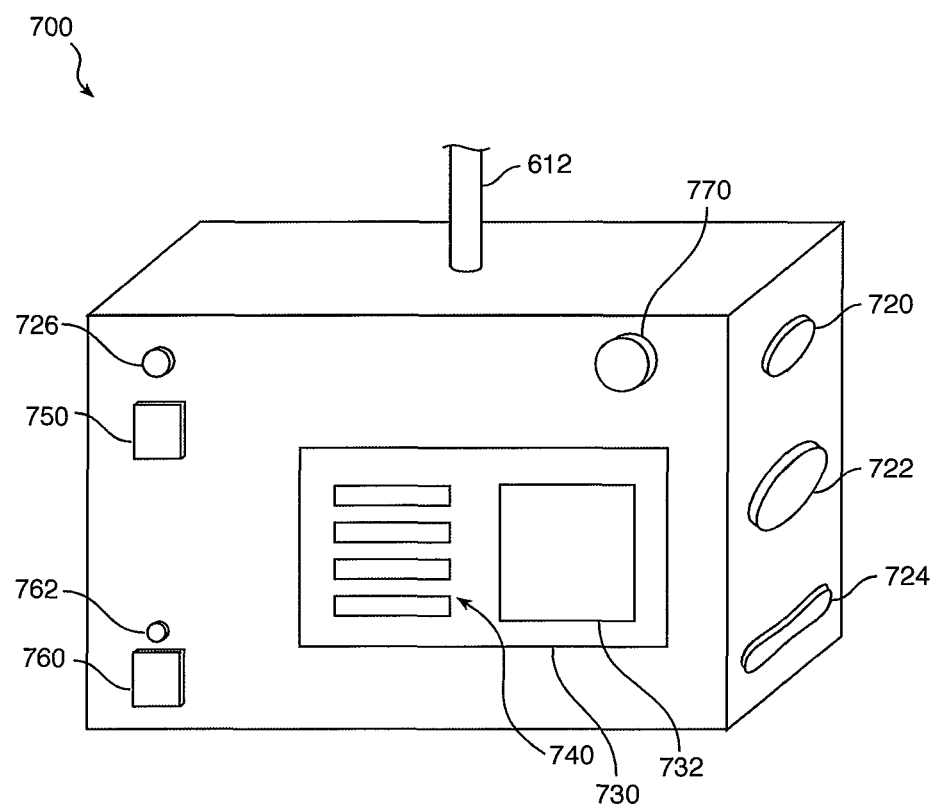
FIG. 7 is a plan view of an implementation of the handset of the incident recorder of FIG. 3.

A handset includes any device that facilitates the capture of original audio and video information, capture of supplemental audio and video information, review of captured information, and classification of information. For example, handset 132 of FIGS. 1, 2, and 3 may be implemented as shown in a perspective view of handset 700 in FIG. 7. The rear side includes terminals for connecting a battery charger of shift hub 120 to the battery (not shown) that is internal to handset 132 (700). Conductor 612 for coupling to headset 500 and hub 600 extends from handset 700. Handset 700 includes dedicated controls (750, 760, 770, 720, 724) and touch-screen legends 740.

A user interface of handset 700 includes event handset mike 726, event switch 750, privacy LED 762, privacy switch 760, touch-screen legends 740 along one edge of display 730, display toggle switch 770, power switch 720, handset speaker 722, and volume switch 724. Display 730 may also present original or supplemental information in a picture-in-picture (PIP) format 732.

The PIP format may be used to review any combination of two video streams or other visual information such as scanned documents. For example, display 730 may present video (e.g., live from camera 510, video oriented camera streams 414) while PIP 732 presents supplemental visual information (e.g., supplemental documents 416, supplemental video streams 420, classification information 424).

Legends may be presented beside the movie or PIP presentation. In another implementation, the entire display area is used for the movie or PIP presentation.

Volume switch 724 operates to increase or decrease a volume of the audio provided by speaker 722.

Cable 612 may be coupled to hub 600 or decoupled from hub 600 for stand-alone operation of handset 700. During stand-alone operation, handset 700 may be used to review original or supplemental information and receive additional supplemental information via handset microphone 726.

Figure 8A:
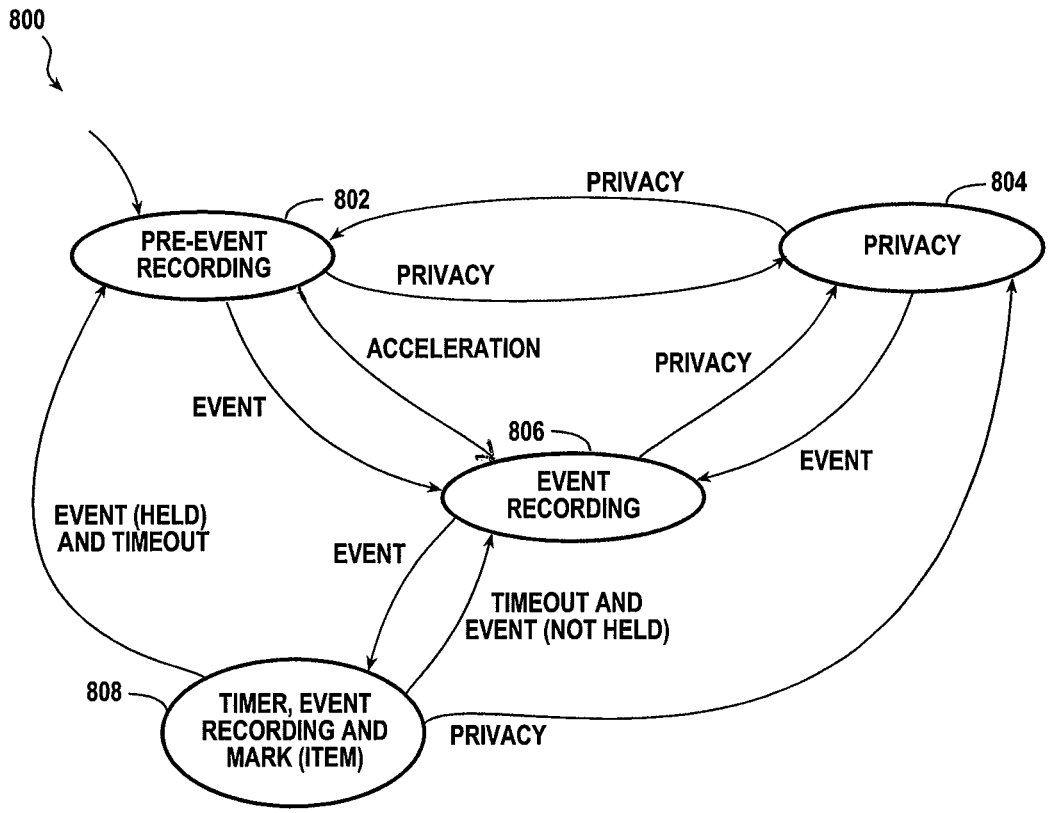
FIGS. 8A and 8B are state change diagrams of states of the handset of FIG. 7 while recording original incident information and controlling the display.
Figure 8B:
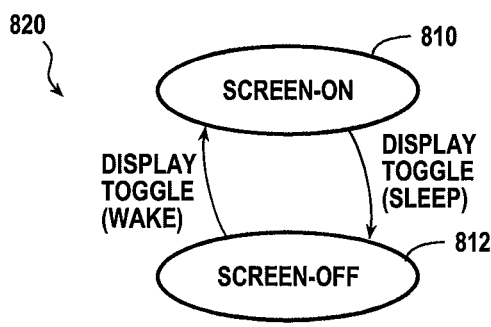

Display toggle switch 770 operates to turn display 730 alternately on and off as shown in state change diagram 820 of FIG. 8B. States of state change diagram 820 include screen-on state 810 and screen-off state 812. While in screen-off state 812, display 730 does not display any information. While in screen-on state 810, display 730 displays information which may include original information, supplemental information, revisions, legends, warnings (e.g., low battery, hub disconnected, headset disconnected), response to an IVR script, and any other information. Successive operations of display toggle switch 770 moves state change diagram 820 between the screen-on state 810 and screen-off state 812.

Processor 340 of a handset 132 or 700 may implement a user interface according to various aspects of the present invention having particular synergies for simplicity of operation. For example, when instructions for performing suitable methods are stored in memory 341 and performed by processor 340, the primary subsystem in which the processor, memory, and user interface is implemented performs state change mechanisms 800 and 900 of FIGS. 8A and 9.

Figure 9:
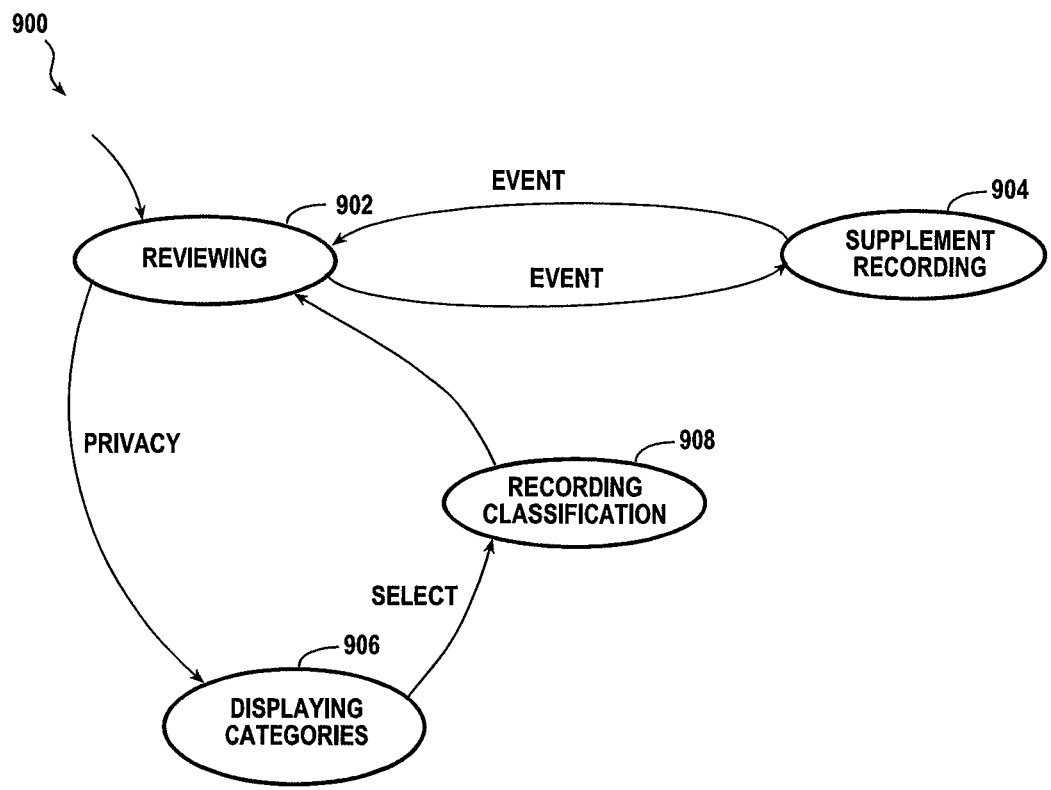
FIG. 9 is a state change diagram of states of the handset of FIG. 7 while reviewing incident information.

The state change logic as indicated in FIGS. 8A and 9 uses conventional symbology: an arrow is followed to change states when the processor detects the signal indicated beside the arrow. A state comprises the performance of the one or more functions described for the state. States and state changes may be implemented with conventional hardware and software (e.g., programming) technologies. Preferably, processor 340 operates in only one state at any instant of time; however, state change mechanisms 800 and 900 may be implemented with additional functions performed in each of the illustrated states. Consequently, a mode of operation may include one state and may further include additional functions performed while in that one state. Additional states may be implemented between the illustrated states without departing from the state change logic as illustrated in FIGS. 8 and 9.

Receipt of a signal may accomplish a transition from one state to another state. A signal may be provided upon operation of a control. For example, an operation of event switch 750 (630) produces EVENT signal and an operation of privacy switch 760 (640) produces PRIVACY signal as shown in FIGS. 8A and 9.

Event switch 750 (630) and privacy switch 760 (640) operate to record original incident information in accordance with state change diagram 800 of FIG. 8A. State change diagram 800 defines states of operation of handset 132 of FIGS. 1-3 and handset 700 of FIG. 7 while recording original information. States include pre-event recording state 802, privacy state 804, event recording state 806, and time, event recording and mark (TEM) state 808. Operation continues in a state until all conditions are met for a state change.

Pre-event recording may also be referred to as pre-recording.

Entry into state 802 may occur on application of primary power (e.g., power switch 720) to the handset or upon detecting that a touch screen icon has been actuated by the user.

While in pre-event recording state 802, handset 132 (700) captures audio and video information into a pre-event circular buffer as described above. The pre-event circular buffer captures information for a period of time before overwriting information previously recorded in the pre-event buffer.

While in pre-event recording state 802, an operation of privacy switch 760 (640) causes a state change to privacy state 804. An subsequent operation of privacy switch 750 (640), prior to operation of any other control, causes a state change back to pre-event recording state 802.

While in pre-event recording state 802, an operation of event switch 750 (630) causes a state change to event recording state 806. A transition from pre-event recording state 802 to event recording state 806 may also occur upon detecting a sudden acceleration of handset 132 (700). Generally, handset 132 (700) is worn or held by a user. Sudden acceleration of handset 132 (700) may indicate that an event has occurred that should be recorded. Events that may produce a sudden acceleration may include the operator rapidly accelerating from a stop and a force applied to the operator (e.g., physical blow, struck by a bullet). A sudden acceleration of the handset may indicate a situation in which the user would like to operate event switch 720 (630), but physically cannot. Acceleration may be detected and reported by accelerometer 348.

While in privacy state 804, handset 132 (700) performs the privacy function and records no audio or video information. Although oriented camera 510 and various microphones (520, 530, 620, 726) may continue to receive video and audio information and provide signals responsive to the video and audio information, no video or audio information is recorded in memory 341. While in privacy state 804, privacy indicator 762 (642) is illuminated (e.g., LED, lamp). In any other mode, privacy indicator 762 (642) is not illuminated.

While in privacy state 804, an operation of privacy switch 760 (640) causes a state change to pre-event recording state 802. While in privacy state 804, an operation of event switch 750 (630) causes a state change to event recording state 806.

While in event recording state 806, handset 132 (700) captures original audio and video information about an incident. Event recording state 806 captures audio information from handset mike 726 or hub mike 620, but preferably from oriented mike 520 and head mike 530. Event recording state 806 captures video information from oriented camera 510. Processor 340 stores captured information in memory 341 in data structures as discussed above.

While in event recording state 806, an operation of privacy switch 760 (640) causes a state change to privacy state 804. While in event recording state 806, an operation of event switch 750 (630) causes a state change to TEM state 808.

While in TEM state 808, handset 132 (700) continues to capture original audio and video information; however, upon entering TEM state 808, processor 340 records a mark in the video and audio streams to indicate that event switch 750 (630) was operated at that time during data collection. An operator may insert a mark into a data stream during recording of the incident as a reminder to provide supplemental information about some aspect of the incident. A mark may be stored within a video or audio stream (e.g., same MPEG-4 container, different container, but related by time) or separately with information to provide a correlation between the mark and the video or audio streams at the time the mark was made.

Each entry into TEM state 808 records a new mark associated with the video and audio data being recorded at the time of entry. While reviewing, marks may be used as an index to the video and audio streams. Marks may be searched, sorted, and/or arranged in any manner to facilitate review. Information presented for review may skip (e.g., fast forward, fast reverse, hypertext link) from a scene of a movie associated with one mark to a scene of a movie associated with another mark to speed access to information.

During review of previously recorded information, a list of recorded marks (with or without descriptions) may be presented to assist in completing a revision. A mark may be annotated to provide descriptive information about the video and audio content at the time of the mark. After adding a description to a mark, a list of recorded marks may be presented with descriptions to assist in reviewing. Descriptions may include conventional thumbnails of the movie.

Upon entering TEM state 808, a timer is started. Operation of handset 132 (700) remains in TEM state 808 for a duration of time (e.g., until expiration of a countdown timer). The state change that occurs after the duration of time depends on whether event switch 750 (630) was held (e.g., presses, activated, selected) for the duration of time or whether switch 750 (630) was operated and released prior to expiration of the duration of time. The duration of time may be for any amount of time, preferably a few seconds (e.g., 2-3).

Event switch 750 (630), privacy switch 760 (640), and the timer in cooperation with event switch 750 (640) operate to cause state changes out of TEM state 808. While in TEM state 808, an operation of privacy switch 760 (640) causes a state change to privacy state 804. While in TEM state 808, operating and holding event switch 750 (630) for the duration of time causes a state change to pre-event recording state 802. Operating but not holding event switch 750 (630) for the duration of time causes a state change to event recording state 806.

The resolution of video information recorded in pre-event recording state 802 may be the same or less than the resolution of the video information recorded in event recording state 806.

Event switch 750 (630) and privacy switch 760 (640) are operated to supplement and classify original information (e.g., while reviewing previously recorded information) in accordance with state change diagram 900 of FIG. 9. State change diagram 900 defines states of operation of handset 132 of FIGS. 1-3 and handset 700 of FIG. 7 while reviewing previously stored information. States include reviewing 902, supplement recording 904, displaying categories 906, and recording classification 908. Operation continues in a state until all conditions are met for a state change.

While in reviewing state 902, handset 132 (700) presents previously recorded information on display 730 for review by the author-operator. Handset 132 (700) may further present marks stored during event recording. Marks may be presented to an author-operator as legends 740 for selection by the operator. While reviewing, handset 132 (700) may further provide audible interactive-voice-response (IVR) prompts and corresponding legends 740 to receive an operator response via selection of one or more legends 740 of display 730. Handset 132 (700) may further present suggested categories as legends during reviewing.

While in reviewing state 902, an operation of event switch 750 (630) causes a state change to supplement recording state 904. A subsequent operation of event switch 750 (630) causes a state change back to reviewing state 902. While in reviewing state 902, an operation of privacy switch 760 (640) causes a state change to displaying categories state 906.

While in supplement recording state 904, handset 132 (700) captures audio and video supplemental information from oriented mike 520, head mike 530, handset mike 726 or hub mike 620 and oriented camera 510. Supplemental information may provide additional information about the original information being reviewed or other descriptive information provided by author-operator as described above. Supplemental information may be information provided responsive to audible IVR prompts. An author-operator may provide a response to an IVR via head speaker 336, hub speaker 326, handset speaker 344, or legends 740 as described above. Supplemental information may include an audio description from the author-operator or activation of a touch-screen legend by the author-operator. Supplemental information is stored in memory 341. Supplemental information may be associated (e.g., same MPEG-4 container, point to an MPEG-4 container) to original information presented for review.

While in supplement recording state 904, an operation of event switch 750 (630) causes a state change to reviewing state 902.

While in displaying categories state 906, handset 132 (700) presents categories for classifying information. Categories may be presented as IVR audio prompts or legends 740. An author-operator may select a category to classify the information being reviewed or in advance of recording supplemental information. Processor 340 stores the category selected by the author-operator in memory 341. Classification information (e.g., indicia of one or more categories and associated information) may be stored in the same MPEG-4 container as the information being classified or in a separate data structure (e.g., 424). Examples of possible categories for classification are provided above.

While displaying categories, any control 343 may be used to select a category. In one embodiment, categories are presented as legends 740 and selection is performed by selecting a legend of legends 740. In another implementation, categories are presented as an audio IVR list of categories and selection is performed by operation of a control 343, such as privacy switch 750 (630).

While in display state 906, selection of a category, whether by legends 740 or operation of privacy switch 750 (630), causes a state change to recording classification state 908.

While in recording classification state 908, processor 340 stores indicia of one or more categories designated by the author-operator. Storing indicia of one or more categories may be accomplished as discussed above and may include encryption of the information associated with the category. Completion of recording the category causes a state change to reviewing state 902.

The foregoing description discusses preferred embodiments of the present invention, which may be changed or modified without departing from the scope of the present invention as defined in the claims. The examples listed in parentheses may be alternative or combined in any manner. The invention includes any practical combination of the structures and method steps disclosed. The words "and" and "or" as used herein shall be construed both conjunctively and disjunctively and each shall include the other (e.g., and/or) whenever practical unless expressly stated otherwise. While for the sake of clarity of description several specifics embodiments of the invention have been described, the scope of the invention is intended to be measured by the claims as set forth below.

What is claimed is:

1. A method for controlling a video recorder of a primary subsystem, the primary subsystem including a processor that detects operation of a first control by a user and of a second control by the user and that performs the method to accomplish pre-recording and event recording, the method comprising:
   if pre-recording:
      in response to detecting operation of the first control:
         discontinuing pre-recording; and
         beginning event recording; and
      in response to detecting operation of the second control, discontinuing pre-recording;
   if event recording:
      in response to detecting operation of the first control, recording an event marker;
      in response to detecting prolonged operation of the first control for a period:
         discontinuing event recording; and
         beginning pre-recording;
      in response to detecting operation of the second control, discontinuing event recording; and
   if event recording is discontinued:
      in response to detecting operation of the second control, continuing pre-recording; and
      in response to detecting operation of the first control, beginning event recording.

2. The method of claim 1 wherein the primary subsystem further includes an indicator, controlled by the processor to indicate that event recording is discontinued.

3. The method of claim 1 wherein the primary subsystem further includes a log, and the method further comprises recording in the log respective times of operation of the first control.

4. The method of claim 1 wherein the primary subsystem further includes a log, and the method further comprises recording in the log respective times of operation of the second control.

5. The method of claim 2 wherein method further comprises:
   if pre-recording, controlling the video recorder to record video at a first resolution; and
   if event recording, controlling the video recorder to record at a second resolution greater than the first resolution.

6. The method of claim 2 wherein the processor further detects acceleration of the primary subsystem, and the method further comprises if pre-recording, in response to detecting acceleration, discontinuing pre-recording and beginning event recording.

7. The method of claim 2 wherein the processor further controls a display for reviewing recordings and the method further comprises if reviewing, in further response to detecting operation of the first control discontinuing reviewing and beginning supplement recording.

8. The method of claim 2 wherein the processor further controls a display for reviewing recordings and the method further comprises if reviewing, in further response to detecting operation of the second control discontinuing reviewing and displaying a plurality of categories.

9. The method of claim 2 wherein the processor further controls a display for reviewing recordings, the processor further detects operation of a third control by the user and the method further comprises, in response to detecting operation of the third control, beginning display of recordings for review by the user.

10. The method of claim 2 wherein the primary subsystem further includes a microphone, detecting further includes detecting operation of a third control by the user, and the method further comprises, in response to detecting operation of the third control, controlling recording of the user's voice via the microphone.

* * * * *